United States Patent
Willins et al.

(10) Patent No.: US 6,990,587 B2
(45) Date of Patent: Jan. 24, 2006

(54) CRYPTOGRAPHIC ARCHITECTURE FOR SECURE, PRIVATE BIOMETRIC IDENTIFICATION

(75) Inventors: Bruce Willins, East Northport, NY (US); Jacob Sharony, Dix Hills, NY (US); Huayan Wang, Hauppauge, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 844 days.

(21) Appl. No.: 09/834,598

(22) Filed: Apr. 13, 2001

(65) Prior Publication Data

US 2002/0152391 A1   Oct. 17, 2002

(51) Int. Cl.
*H04L 9/00* (2006.01)
(52) U.S. Cl. .................. 713/182; 713/186; 713/189
(58) Field of Classification Search ........ 713/182–186, 713/189, 192–194, 200–202; 380/270, 44; 235/380, 382; 382/100, 115–119, 124
See application file for complete search history.

(56) References Cited

U.S. PATENT DOCUMENTS

| 5,712,912 | A | * | 1/1998 | Tomko et al. ............... 713/186 |
| 5,991,408 | A | * | 11/1999 | Pearson et al. ............. 713/186 |
| 6,085,976 | A | * | 7/2000 | Sehr ........................... 235/384 |
| 6,219,793 | B1 | * | 4/2001 | Li et al. ...................... 713/202 |
| 6,484,260 | B1 | * | 11/2002 | Scott et al. .................. 713/186 |

* cited by examiner

*Primary Examiner*—Hosuk Song
(74) *Attorney, Agent, or Firm*—Fay Kaplun, Marcin, LLP

(57) ABSTRACT

A semiconductor device for securely controlling access to a cryptographic processor including a semiconductor package with a biometric data capture device therein operative to acquire data associated with predetermined biometric characteristic of a user and store it as a biometric key, and a processing unit in the package coupled to the data capture device. An encryption/decryption circuit is also disposed in the semiconductor package and is operative to perform encryption or decryption on input data utilizing the biometric key.

18 Claims, 3 Drawing Sheets

CRYPTOGRAPHIC ARCHITECTURE FOR SECURE, PRIVATE BIOMETRIC IDENTIFICATION

BACKGROUND OF THE INVENTION

1. Field of the Invention

The apparatus and methods consistent with the present invention relates to mobile computers for use in wireless local area networks, and more particularly to the security network architecture, configuration software and communications protocols needed to support the biometric identification of an authorized user of a mobile unit to be operated in such networks, and from one secure network to another secure network.

2. Glossary of Terms

Access Agent: A logical component that provides support for different access protocols and streams—Frame Relay, HDLC (High Data link Control) CBO (Continuous bit Operations, ATM (Asynchronous Transfer Mode), or TCP/IP.

Call (noun): Point-to point multimedia communication between two IP network endpoints. The call begins with the call setup procedure and ends with the call termination procedure. The call consists of the collection of reliable and unreliable channels between, all the channels terminate at the Gateway where they are converted to the appropriate representation for the PSTN end system.

Caller: The entity initiating a call.

Called: The destination of a call

Dynamic Address Mapping Service: A service which provides a lookup function between text based strings and IP addresses and/or phone numbers, where the result of the lookup can change relatively quickly over time.

Endpoint: An H.323 Terminal or Gateway. An endpoint can call and be called. It generates and/or terminates information streams.

Gatekeeper: The Gatekeeper (GK) is an H.323 entity that provides address translation and controls access to the network for H.323 Terminals and Gateways. The Gatekeeper may also provide other services to the H.323 Terminal and gateways, such as bandwidth management and locating Gateways.

Gateway: An H.323 Gateway (GW) is an endpoint which provides for real-time, two way communications between H.323 Terminal on a IP network and: other ITU terminals; phones on the PSTN; other terminals on other networks.

H.323 Entity: Any H.323 component, including H.323 Terminals, Gateways, Gatekeepers.

IMTC: (International Multimedia Teleconferencing Consortium) An organization whose mission is to bring together all organizations involved in the development of interactive, multimedia teleconferencing products and services to help create and promote the adoption of industry-wide interoperability standards. The VoIP forum is part of the IMTC.

Information Stream: A flow of information of a specific media type (e.g. audio) from a single source to one or more destinations.

Internet address: The network layer address of an H.323 endpoint, Gatekeeper, or DNS server.

Internet: An inter-network of networks interconnected by bridges or routers. LANS described in H.323 may be considered parts of such internetworks.

IP network: A network that uses IP as the network layer protocol. This includes networks such as Internet, Intranets, LANs etc.

RAS Channels: Unreliable channels used to convey the registration, admissions, bandwidth change, and status messages (following H.225.0) between H.323 entities.

Reliable Channel: A transport connection used for reliable transmission of an information stream from its source to one or more destinations.

Reliable Transmission: Transmission of messages from a sender to a receiver using connection-mode data transmission. The transmission service guarantees sequenced, error-free, flow-controlled transmission of messages to the receiver for the duration of the transport connection.

Transport Connection: An association established by a transport layer between two H.323 entities for the transport of data. In the context of H.323, a transport connection provides reliable transmission of information.

VoIP: Voice over Internet Protocol. The VoIP Forum is developer of specification of such protocol.

Zone: A zone, as defined in H.323, is a collection of all terminals, Gateways (GW), and Multipoint Control Units (MCU) managed by a single Gatekeeper (GK).

3. Background of the Invention a. Communications Networks

A typical data communications network system comprises at least one server and two or more clients interconnected through a network link. The International Standards Organization (ISO) has published specifications for their Open Systems Interconnection (OSI) reference model for layered data communications, which has become a standard framework for describing network communications systems. The ISO reference model is divided into seven layers, each defining a set of services and related protocols for handling messages at that layer. The ISO's reference model defines the following seven layers; (1) physical; (2) data link; (3) network; (4) transport; (5) session; (6) presentation; and (7) application. Since the concepts and teachings of the present invention generally fall within the transport through application layers; a detailed discussion of the operations taking place at the lowermost (e.g., physical, data link, and network) layers was not necessary for purposes of describing the present invention, as the operations at these levels are known to those skilled in the art and are transparent to the operations of the present invention.

The physical layer comprises the actual physical devices and medium used to transmit information. The data link layer frames data packets and controls physical layer data flow, insuring delivery of data regardless of the actual physical medium. The network layer addresses and routes data packets. It creates and maintains a route in the network between a source node and a destination node. The transport layer creates a transport pipeline between nodes and manages the network layer connections. The session layer typically provides remote procedure call (RPC) support, maintains the integrity of the connection between nodes, and controls data exchange. The presentation layer encodes and decodes data and provides transparency between nodes. Finally, the application layer provides the interface to end-user processes and provides standardized services to applications.

b. Wireless LANs

Wireless local area networks use infrared or radio frequency communications channels to communicate between portable or mobile computer terminals and stationary access points or base stations. These access points are in turn connected by a wired (or possibly wireless) communication channel to a network infrastructure which connects groups of access points together to form a local area network, including, optionally, one or more servers or host computer systems.

Wireless and radio frequency (RF) protocols are known which support the logical interconnection of portable roaming terminals having a variety of types of communication capabilities to host computers. The logical interconnections are based upon an infrastructure in which at least some of the remote terminals are capable of communicating with at least two of the access points when located within a predetermined range therefrom, each terminal unit being normally associated with and in communication with a single one of such access points. Based on the overall spatial layout, response time, and loading requirements of the network, different networking schemes and communication protocols have been designed so as to most efficiently regulate the communications between a given terminal and the network through the selected access point. One such protocol is described in U.S. Pat. Nos. 5,029,183; 5,142,550; 5,280,498; and 5,668,803, each assigned to Symbol Technologies, Inc. and incorporated herein by reference.

Another such protocol is described in U.S. Pat. No. 5,673,031. Still another protocol is set forth in the ISO/IEC 8802-11, or ANSI/IEEE Std 802.11 entitled "Wireless LAN Medium Access Control (MAC) and Physical Layer (PHY) Specifications" (1999 edition) available from the IEEE Standards Department, Piscataway, N.J. (hereinafter the "IEEE 802.11 Standard").

The IEEE Project 802 is concerned with network architecture for local area networks. The IEEE 802.11 Standard is directed to wireless local area networks, and in particular specifies the MAC or the data link layer and the PHY or physical link layer.

In Europe, the European Telecommunications Standards Institute (ETSI) has been working on HIPERLAN (European High PERformance LAN), the next generation of high speed wireless systems. The frequency spectrum for HIPERLAN in the 5 GHz and 17 GHz bands has been allocated by the European Conference of Postal and Telecommunications Administrations (CEPT), with a data rate of over 20 Mbit/sec.

c. Modulation Techniques

The current implementations of commercial wireless LAN networks utilize a radio operating in the 2.4 to 2.4835 GHz spread spectrum band which is the industrial, scientific, and medical (ISM) band allocated for unlicensed use by the FCC. The current systems utilize one of two basic types of spread spectrum modulation: direct-sequence and frequency-hopping, or a technique known as complementary code keying (CCK).

d. Roaming

The term "roaming" relates to mobile units associating with different access points. Each mobile unit analyzes received signals from access points to identify and associate with an eligible access point. Analogous to cells in a cellular telephone network, the region around a given access point may also be referred to as a "cell." Roaming between cells provides great flexibility and is particularly advantageous in locations that are difficult to wire, for simple relocation of work stations, and for portable work stations.

Although the IEEE 802.11 Standard provides the basic packet types which enable roaming, it does not actually set the roaming algorithm. According to the standard, the mobile unit determines the access point with which it will associate and the access point must accept the mobile unit unless the access point is defective or certain alarm conditions exist, such as memory full. There is, however, no suggestion of how, or by what criteria, other than those mentioned above, the mobile unit might select an appropriate access point, or an optimum access point.

In order for a mobile unit to associate with an access unit the mobile unit follows an association protocol. The mobile unit firstly sends out a probe packet having no destination address which is accordingly accepted by all access units within range. The probe packet contains an identifying address for the mobile unit has sent it. The access unit then transmits a probe response packet which includes information such as the access unit address, the hopping pattern, the present channel, time left in the present channel and other timing information. The mobile unit then decides whether or not to associate with a given access unit, based on for example the strength of the signal of the access unit and any information the access unit may have issued indicating how many mobile units are already associated with it. If the mobile unit decides to associate, it sends an associate message or packet and the access unit decides whether to accept the association request and issues an association response after the request is accepted.

In addition the access unit transmits a "beacon" at predetermined intervals containing, in addition to other information, timing information similar to that contained in probe response packet.

The mobile units can operate in two power management modes, either continuously awake mode (CAM) or power save polling (PSP) mode. In the former mode, CAM, the mobile unit remains in substantially continuous communication with an access unit so as to receive and transmit all information intended for the mobile unit practically instantaneously. Of course that mode of operation requires a high level of power consumption which is not always desirable for a portable mobile unit which is relying on internal power such as batteries. In the alternative PSP mode, the mobile unit sends out a polling signal at predetermined intervals of time to enquire whether an associated access unit has stored any messages for that mobile unit in a suitable buffer. Similarly the mobile unit can store any message to be transmitted in a buffer and transmit all of the messages so stored at predetermined intervals. Such a mode of operation clearly allows decreased power consumption. Under the IEEE 802.11 protocol the beacon signal contains information about which PSP stations have data waiting.

e. Coordination Functions

In the IEEE 802.11 network architecture, the management of stations within a region in which the station can communicate with each other is performed by software known generically as a Coordination Function (CF). A group of mobile units that can communicate with one another is known as a basic service set or BSS. In order to ensure that communications are coordinated, the CF determines when a station operating within a BSS is permitted to transmit and may be able to receive protocol data units (PDUs) via the wireless medium. The BSS is formally defined as the set of stations controlled by a single Coordination Function. There are two types of coordination functions—the Distributed Coordination Function (DCF), and the Point Coordination Function (PCF). The use of DCF is mandatory, while PCF is optional under the IEEE 802.11-1999 standard.

A larger group of network units, called the extended service set or ESS is defined as a set of one or more interconnected Basic Service Sets and integrated LANS which appear as a single BSS to the logical link control (LLC) layer at any station associated with one of those BSSs.

The key concept is that the ESS network appears the same to an LLC layer as an independent BSS network. Stations anywhere within an ESS may communicate with each other and mobile stations may move from one BSS to another (within the same ESS) transparently to LLC. Mobile units communicate with an AP, and the AP forwards to traffic among themselves to the destination BSS, thus facilitating the roaming of mobile units from one BSS to another.

One (or more) independent BSS or ESS networks may be physically present in the same space as one or more ESS networks. For example, an ad hoc network may be operated in the region of an ESS network; or physically overlapping independent IEEE 802.11 networks may be set up by different adjacently located organizations, each with their own ESS identification code.

f. Security

IEEE 802.11 specifies an optional privacy algorithm, WEP that is designed to satisfy the goal of wired LAN "equivalent" privacy. The algorithm is not designed for ultimate security but rather to be "at least as secure as a wire." IEEE 802.11 uses the WEP mechanism to perform the actual encryption of messages. Privacy may only be invoked for data frames and some Authentication Management frames. All stations initially start "in the clear" in order to set up the authentication.

SUMMARY OF THE INVENTION

Briefly, and in general terms, the present invention provides a semiconductor device for securely controlling access to cryptographic processor including a semiconductor package; a cryptographic processor in the semiconductor package, including a biometric data capture circuit which acquires data associated with predetermined biometric characteristic of a user and stores it as a biometric key; and a encryption/decryption circuit and operative to perform encryption or decryption on input data utilizing the biometric key.

Another feature of the present invention is to provide a mobile computer having a hand-held housing and a wireless RF transceiver in the housing to transmit and receive data over a wireless communications channel. A data input device and a data output device is also provided in the housing. A cryptographic processor is disposed in a single semiconductor package in the housing, including a biometric data capture device contained in the semiconductor package to capture data associated with predetermined biometric characteristic of a user and store it as a biometric key, and a encryption/decryption circuit operative to perform encryption or decryption on input data utilizing the biometric key.

Still another feature of the present invention is to provide a secure wireless local area network including a mobile computer including a cryptographic processor and a wireless RF transceiver and an access point connected to a wired local area network including a wireless RF transceiver capable of communication with the mobile computer.

A security protocol program is executed in the cryptographic processor in the mobile computer and in the access point to establish authentication of the mobile computer by verification of a stored encrypted biometric key in the cryptographic processor.

DESCRIPTION OF THE PREFERRED EMBODIMENT

Today's authentication and access control techniques rely on shared secrets such as passwords and/or physical tokens. Tokens are easily lost or stolen. Passwords are cumbersome so in many instances actions are taken which compromise their security, e.g.; using a common password for multiple applications, writing down passwords in day planners or notebooks, using non-secure character strings such as names or birth dates.

Passwords and tokens do not represent true end-to-end authentication, that is, human-to-machine. True authentication requires a physiological biometric of the person. But biometrics that uniquely identifies a person is an extremely sensitive and personal piece of information and must be securely managed (protected) within a computing environment. The problem is how to alleviate concerns of "identity theft" and biometric misuse.

The threat of compromise is magnified by trends in open platform mobile computing. Open platform mobile devices are expected to run scripts and executable programs loaded from external sources (e.g. loaded via email or web browsing). Such malicious "programs" (e.g. through a "Trojan horse") can compromise the integrity of non-secured data stored in memory or accessible elsewhere by the processor.

The privacy of biometric data is also more readily compromised by new modalities of transport. Today data is often transported over cables in physically secured environments, administered by a single authority. The new paradigm is to use public networks for transport which are neither centrally administered nor physically secured. Wireless media compounds the problem by virtually eliminating physical security.

There are numerous methods of biometric identification such as retinal or iris scans, facial features, voiceprints, fingerprints, hand geometry. All biometric systems start with elements that can acquire the necessary information in a computer useable form. For voice this is a microphone, a set of amplifiers and an analog to digital converter (sometimes referred to as a CODEC). For facial feature ID the sensor may be an imager taking the form of optical lenses and a sensing device (e.g. CCD or CMOS array). The sensor may also be a sensor for detecting a fingerprint. In all cases the biometric data output of the sensor must be secured.

Since the processor can be compromised by a malicious program, the sensor data must be secured independently of the main CPU. Therefore, taking the data into memory and then encrypting it for transport (or future processing) is not sufficient.

Figure 1:
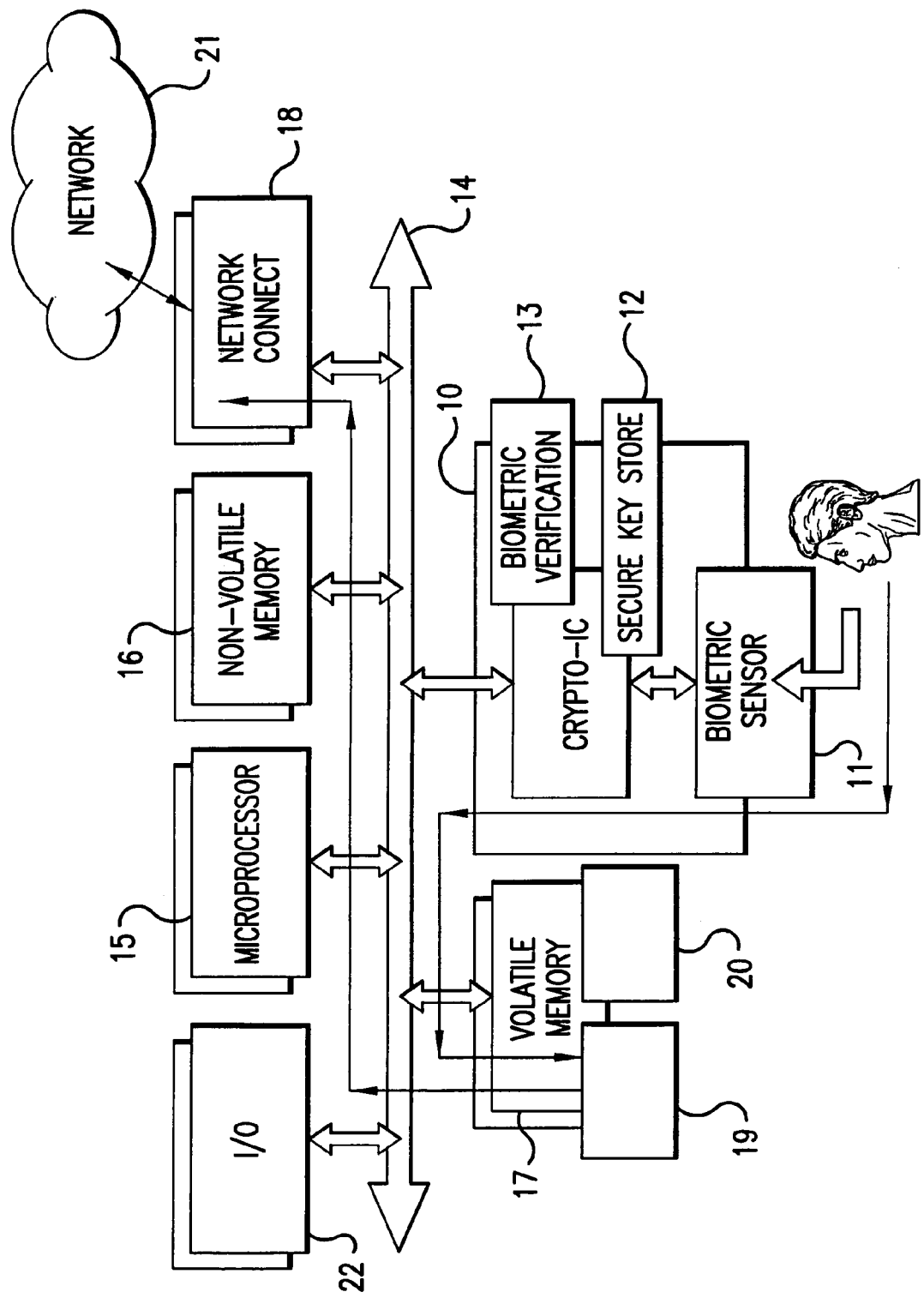
FIG. 1 is a block diagram of the architecture of a mobile computer incorporating the present invention.

The proposed solution according to the present invention is to consider the biometric data and/or sensor a component of the security architecture. FIG. 1 illustrates a block diagram of a mobile computer with a biometric sensor 11 reading and transporting data to a crypto module 10. The sensor 11 can either be a separate component or integrated into the crypto module 10. Thus, it may be a CCD device for imaging a face or fingerprint, such device being part of the module 10.

The mobile computer itself is illustrated by a highly simplified block diagram depicting a microprocessor 15, non-volatile memory 16, volatile memory 17, network interface or connect unit 18, and input/output devices 22, which are all interconnected by a bus 14. The crypto module 10 is also connected to the bus 14. The biometric sensor data is encrypted prior to entering the processor domain or bus 14. That is, the processor 15 cannot access the unencrypted biometric data nor can it access the key used to encrypt the data. Thus, the sensor 11 registers the actual biometric data, and processes and stores in the module 10. All key creation, key exchange, and authentication is done autonomously between the crypto module 10 and an end server or system that administers biometric keys or prints.

All biometric and cryptographic keys are stored securely in a store 12 in the crypto module 10. The module is tamper-proof to thwart a physical attack by an invasive intruder. Once the secure biometric data is stored in memory 12, it can be transmitted to a remote server for verification. It is envisioned that the cryptographic module will use standards based end-to-end security protocols such as IPSec.

In a similar manner, the cryptographic module can be used to perform client based verification. In this mode, known biometric prints (shown as reference blocks 19 and 20) are either retrieved and/or stored in encrypted fashion in memory 17. The encrypted prints can be loaded into the crypto module 10. The crypto module 10 decrypts the data and performs an internal biometric verification 13. Once again, the verification is performed in a secure, autonomous domain in that of module 10. Once a user has been verified by the local mobile computer, a secondary authentication process from the mobile computer to a remote server can take place over the network 21, as will be subsequently exemplified.

Figure 2:
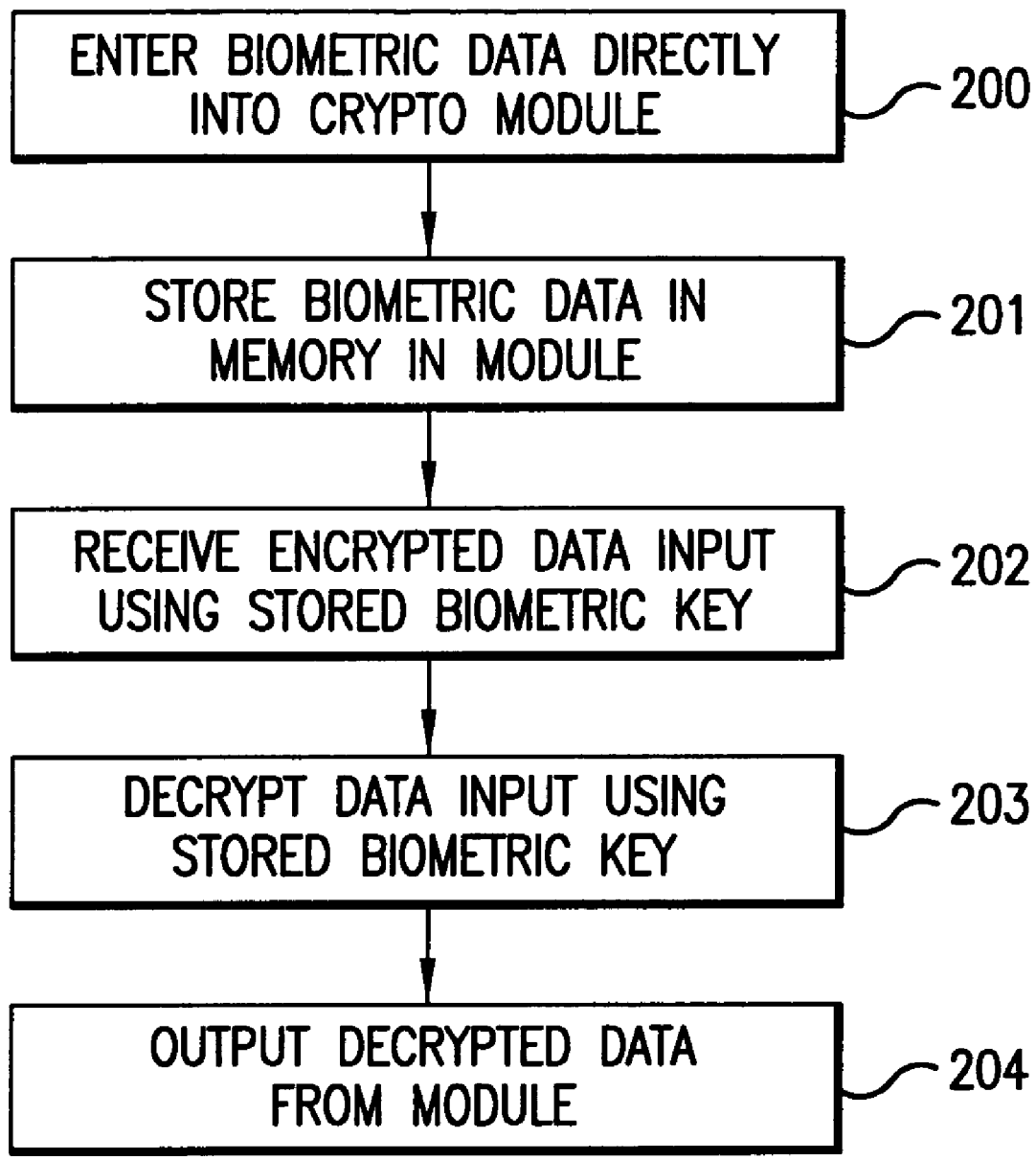
FIG. 2 is a flow chart of the method of the present invention.

Turning next to FIG. 2, there is shown a sequence of operations for initializing the cryptographic module, and utilizing it in actual data processing environment. At the first block 200, the user enters biometric data directly into the crypto module using the sensor 11. In an embodiment, the biometric data is then encrypted, using a defined algorithm and key. The biometric data is then stored in memory in the module, as shown at block 201. The module 10 is then ready to process data. As a cryptographic device, its function is to receive as input encrypted data and return as output the decrypted or actual data. The module thus receives encrypted data input using the biometric key as an encryption parameter, 202. Data which is not encrypted using the biometric key may be processed elsewhere in the computer, or if the key is provided to the module 10, by using the module for decryption. Assuming a biometric key is used, the module decrypts the data input using the stored biometric key, as shown at block 203 typically at the presentation layer level. Finally, the decrypted data is output from the module, as shown at block 204.

Figure 3:
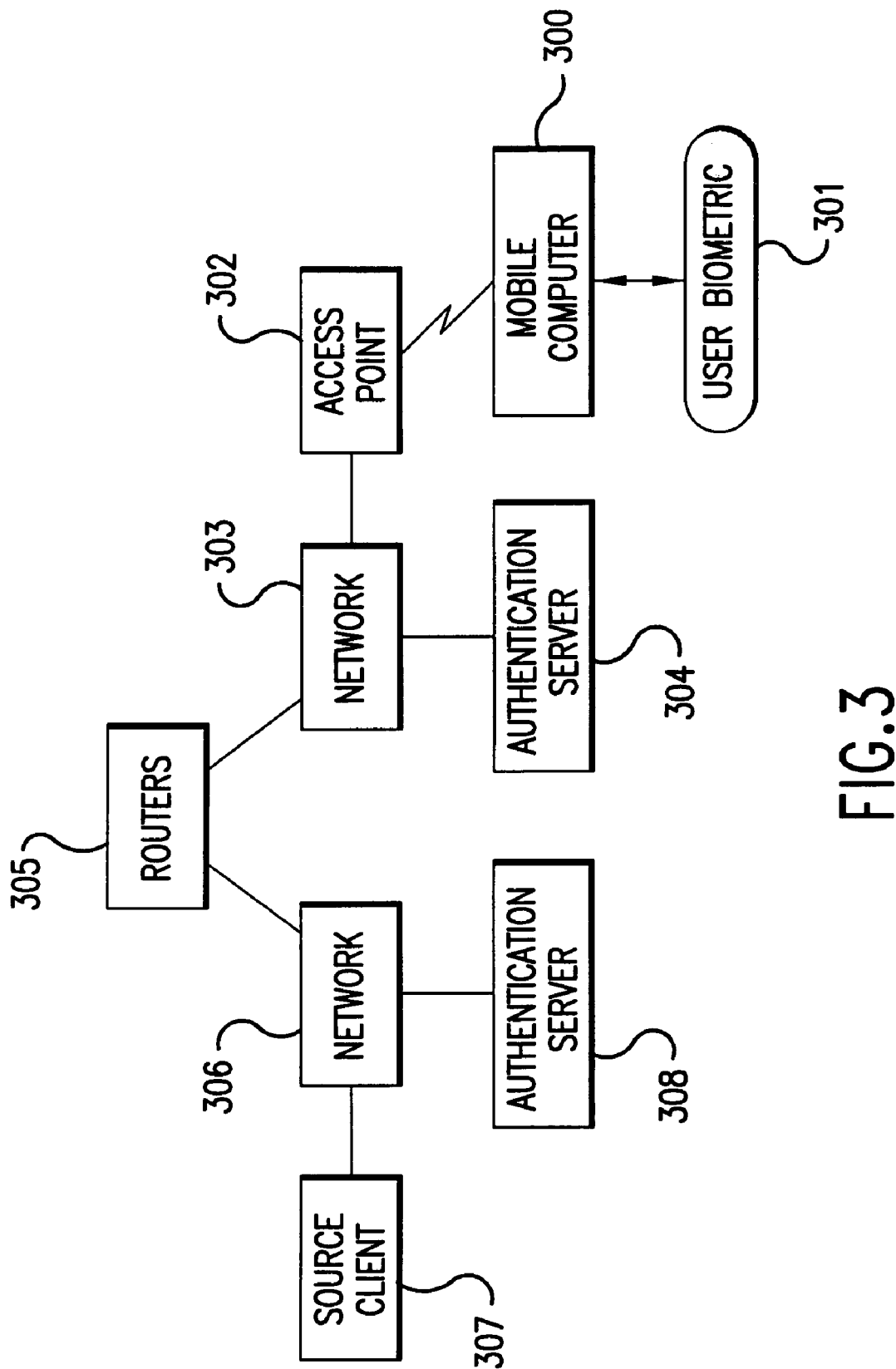
FIG. 3 is a block diagram of a secure network using the present invention.

FIG. 3 is a block diagram of a secure network architecture using the present invention. The mobile computer 300 is illustrated as being in communication with an access point 302. The association and roaming properties of a mobile computer in an IEEE 802.11 wireless network have been described above, and need not be repeated here. In the context of an IP network using VoIP, which is one of the areas of application of the present invention, the access point 302 may also serve as an H.323 Gatekeeper or Gateway. The mobile computer 300 may roam from access point to access point in the WLAN, and even from one ESS to another ESS. Although WEP may be used, at the radio frequency MAC level, enhanced security requires software protocols above the MAC level. The use of a user biometric 301 is a key feature according to the present invention for providing this enhanced security.

The network architecture entails the use of an access agent and/or an authentication agent. The key feature is the use of upper layer authentication protocols, and may be concerned with key distribution, mutual authentication of endpoint, H.323 entities, and stations or mobile units, below the presentation layer processing described above.

The protocols may also define a secure network zone in which privacy, data authentication, and replay protection are, in some sense, assured. The use of RAS channels through such zones may also be possible. Thus, the frame types that may be exchanged between different stations may be grouped into different security classes, corresponding to different station states and zones, but such discussion goes beyond the scope of the present invention.

The access point is connected to a network 303 which includes an authentication server 304. Although network 303 may be secure, it will be connected through routers 305 to another possibly insecure, network 306 on which the source client 307 is located. An authentication server 308 may be provided on that network if end-to-end authentication is required. The source client 307 sends encrypted data (using the biometric key) through network 306, routers 305, to network 303 and access point 302 to the mobile computer 300, where it is decrypted. The crypto module in the mobile computer operates as previously described, defined a security architecture from the WEP MAC level, through 802.1X ports, and authentication agents, using the information stream encryption/decryption processor using a biometric key securely stored in the crypto module.

Various aspects of the techniques and apparatus of the cryptographic module may be implemented in digital circuitry, or in computer hardware, firmware, software, or in combinations of them. Apparatus of the invention may be implemented in computer products tangibly embodied in a machine-readable storage device for execution by a programmable processor, or on software located at a network node or website which may be downloaded to the computer product automatically or on demand. The foregoing techniques may be performed, for example, single central processor, a multiprocessor, one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICs).

It will be understood that each of the elements described above, or two or more together, also may find a useful application in other types of constructions differing from the types described above.

While the invention has been illustrated and described as embodied in a cryptographic architecture, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A semiconductor device for securely controlling access to cryptographic processing of data comprising:
   a semiconductor package;
   a cryptographic processor disposed in the semiconductor package, the processor including a biometric data capture device operative to acquire biometric data associated with a predetermined biometric characteristic of a user and store the biometric data as a biometric key, and an encryption/decryption circuit operative to perform encryption or decryption on input data utilizing said biometric key.

2. A device as defined in claim 1, wherein the stored biometric key is encrypted data.

3. A device as defined in claim 1, wherein the biometric data capture device performs an encryption operation on the biometric data to produce encrypted source data.

4. A device as defined in claim 3, wherein the processor compares the encrypted source data with the stored biometric key.

5. A device as defined in claim 3, wherein the predetermined biometric characteristic is a fingerprint.

6. A mobile computers, comprising:
   a hand-held housing;
   a wireless RF transceiver in the housing to transmit and receive data over a wireless communication channel;
   a data input device in the housing;
   a data output device in the housing; and
   a cryptographic processor disposed in a single semiconductor package, the processor including a biometric data capture device contained in the semiconductor package to capture biometric data associated with a predetermined biometric characteristic of a user and store the biometric data as a biometric key; and an encryption/decryption circuit disposed in the semiconductor package operative to perform encryption or decryption on input data utilizing said biometric key.

7. A device as defined in claim 6, wherein the stored biometric key is stored as encrypted data.

8. A device as defined in claim 6, wherein the biometric data capture device performs an encryption operation on the biometric data to produce an encrypted key.

9. A device as defined in claim 8, wherein the processor utilizes the stored biometric key with a cryptographic algorithm.

10. A device as defined in claim 8, wherein the predetermined biometric characteristic is a fingerprint.

11. A secure wireless local area network comprising:
    a mobile computer including a cryptographic processor and a wireless RF transceiver;
    an access point connected to a wired local area network, the access point including a wireless RF transceiver capable of communication with the mobile computer; and
    a security protocol program executed in the cryptographic processor in said mobile computer and in said access point to establish authentication of the mobile computer by said access point by verification of a stored encrypted biometric key in said cryptographic processor.

12. A network as defined in claim 11, wherein said cryptographic processor includes a biometric data capture device and an encryption/decryption circuit operative to perform encryption or decryption on input data to the processor utilizing said biometric key.

13. A network as defined in claim 12, wherein the stored biometric key is encrypted biometric data from an authorized user of the network.

14. A network as defined in claim 13, wherein the processor performs an encryption operation on the biometric data to produce encrypted source biometric data which is stored as the biometric key.

15. A network as defined in claim 14, wherein the processor compares the encrypted source biometric data with the biometric data of a current user of the mobile computer as derived by the biometric data capture device.

16. A network as defined in claim 14, wherein the biometric data is a fingerprint.

17. A network as defined in claim 14, further comprising an authentication server connected to the wired local area network.

18. A network as defined in claim 17, further comprising a software protocol above a radio frequency MAC level.

* * * * *